United States Patent Office 3,294,798
Patented Dec. 27, 1966

3,294,798
PROCESS FOR THE PREPARATION OF
s-TRIAZINES
Frederic Charles Schaefer, Darien, Conn., assignor to
American Cyanamid Company, Stamford, Conn., a corporation of Maine
No Drawing. Filed Dec. 14, 1964, Ser. No. 418,288
12 Claims. (Cl. 260—248)

This invention relates to a process for preparing tri-substituted s-triazines.

In applicant's copending application Serial No. 361,584, filed April 21, 1964, which is a continuation-in-part of application Serial No. 70,145, filed November 18, 1960 (the latter now abandoned), there is disclosed an improved process for preparing amidine salts. Broadly stated, the latter process comprises reacting certain nitriles, ammonia and an ammonium salt at from 120° C. to 180° C. and at least about 350 p.s.i.g. and thereafter recovering amidine salt in yields of from 70% to 90%. Mol ratios of nitrile:ammonia:ammonium salt of 1:1–30:1–8 are therein required.

It has now been surprisingly discovered that by reducing the concentration of ammonium salt to essentially catalytic amounts, virtually the only product is a tri-substituted s-triazine. No side reactions are believed to occur in the present process other than the formation of small amounts of an amidine salt intermediate. Even the latter intermediate is favorable to the process since it further reacts to yield more tri-substituted s-triazine. Consequently, it is possible to carry the reaction virtually to completion by control of proportions of ingredients and reaction time, and to obtain good material balances.

The ease of reaction and substantial yields of tri-substituted s-triazine obtainable by the present process are surprising particularly in view of the general disrepute of nitrile-ammonia-ammonium salt systems. Thus Cornell, J. Am. Chem. Soc., 50, 3311 (1928), reported the formation of small quantities of benzamidine and propionamidine hydrochlorides when the nitriles were heated with equimolar amounts of ammonium chloride in liquid ammonia under pressure at 200° C. Also, Oxley et al., J. Chem. Soc., 303 (1948), reported that in the fusion of p-methanesulfonylbenzonitrile with ammonium thiocyanate or dimethylammonium benzenesulfonate at 180° C. in the presence of ammonia for 3 hours, a triazine was formed in only 10–12% yield in addition to the amidine salt. However, they also reported that the use of ammonium chloride in place of ammonium thiocyanate gave neither the amidine hydrochloride nor the triazine under the same conditions.

In essence, the present process comprises reactively contacting, in the presence of ammonia, (1) a nitrile selected from the group consisting of RCN and

R″
|
R′CHCN wherein R is selected from the group consisting of aryl, alkaryl, chlorophenyl, nitrophenyl, p-methanesulfonylphenyl and pyridyl, R′ is selected from the group consisting of aryl and alkoxy, and R″ is selected from the group consisting of hydrogen and alkyl, and (2) a catalytic amount of a salt selected from the group consisting of ammonium halide and the amidine salt resulting from the reaction of said nitrile and said ammonium salt, and recovering resultant s-triazine.

Typical nitriles falling within the above definition are benzonitrile, m- and p-tolunitrile, p-methanesulfonylbenzonitrile, m- and p-nitrobenzonitrile, 2-cyanopyridine and aryl- or alkoxy-containing nitriles wherein said aryl and alkoxy groups are attached to the CN group through a carbon atom having at least one hydrogen atom. The latter class of compounds are the so-called "activated" nitriles, i.e., nitriles containing an acidic

|
—CH— or —CH$_2$— group alpha to the CN. Typical of this class of nitriles are phenylacetonitrile, 2-t-butoxypropionitrile, t-butoxyacetonitrile and the like. The nitriles may be employed singly or in admixture. When mixed nitriles are used, the product is generally an unsymmetrically tri-substituted s-triazine.

The ammonium salts useful in the process are ammonium chloride and ammonium bromide. The amidine salts are any of the salts formed as intermediates in the instant process and may be represented by the formula

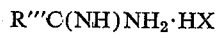
R‴C(NH)NH$_2$·HX wherein R‴ is selected from the group consisting of R and

R″
|
R′CH— as defined in the nitrile formulas above and X is chlorine or bromine. Typical amidine salts are the hydrochlorides and hydrobromides of benzamidine, 2-amidinopyridine, phenylacetamidine, propionamidine, t-butoxyacetamidine, and the like. The preferred starting salt is ammonium bromide.

A wide range of reaction temperature, pressure and time is permissible in the present process. Thus the nitrile and ammonium salt may be reacted at from about 100° C. to 200° C. under positive pressures ranging from atmospheric to about 1200 p.s.i.g. for from about 1 hour up to several days, e.g., 3 days or more. Optimum reaction conditions will depend on choice of nitrile and reaction rate. Thus for certain nitriles, e.g., benzonitrile and the tolunitriles, it is preferred to effect reaction in an autoclave under an ammonia pressure of about 700 to 1000 p.s.i.g. at about 125° C. to 180° C. In the case of other nitriles, e.g., the "activated" nitriles, reaction occurs readily at atmospheric pressure at about 125° C. to 180° C. However, it is also possible to react at subatmospheric pressures although for most purposes this is impractical due to the correspondingly longer reaction time required.

The reaction is essentially trimerization of the nitrile to the tri-substituted s-triazine. Reaction is conveniently effected by passing ammonia at the desired pressure through a suitable reaction flask containing the nitrile and ammonium or amidine salt while heating. When superatmospheric pressures are desirable, the reaction will be conducted in an autoclave.

The amount of ammonia is not critical; only enough ammonia need be present to exclude moisture and to provide an ammonia medium in the reaction mixture, e.g., by bubbling ammonia gas at essentially atmospheric pressure through the reaction flask or by reacting in liquid ammonia in an autoclave. Generally, about equimolecular proportions of nitrile and ammonia will be suitable but effective proportions may range from about 0.2 to 10 mols of ammonia per mol of nitrile.

The proportion of ammonium salt or amidine to nitrile, however, is critical. Less than 1 mol of the salt per mol of nitrile is required in order to provide substantial yields of s-triazine. Thus the salt is employed in catalytic amounts, i.e., in amounts effective to promote trimerization of the nitrile to tri-substituted s-triazine. The preferred range of catalytic proportions is about 10 to 30 mol percent of ammonium or amidine salt based on total mols of nitrile and salt.

No particular advantage is obtained by incorporating inert solvents such as alcohols in the reaction medium since reaction occurs cleanly in the presence of ammonia alone. However, in some cases, inert organic solvents may be useful particularly when ammonia is employed in smaller proportions. Such solvents include aliphatic monohydric alcohols, e.g., methanol, ethanol, n- and isopropanol, n- and isobutanol, and the like.

Conventional separation techniques are employed to isolate the s-triazine products including aspiration to remove ammonia and extraction with suitable solvents to remove unreacted nitrile and ammonia salt.

The present process is an outstanding advance over other methods of converting nitriles to s-triazines since there are no side reactions, the yields are essentially quantitative, the reaction equipment required is very simple and the nitriles are more available than other starting materials for s-triazine preparation.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

To a stainless steel autoclave is added 1.0 mol of benzonitrile, 0.54 mol of ammonium bromide and 1.0 mol of ammonia. The mixture is heated for 18 hours at 150° C.–170° C. under a pressure of 800–1000 p.s.i.g. The autoclave is then cooled and aspirated to remove the ammonia. The contents are next withdrawn from the autoclave, extracted with ether to remove unchanged nitrile, extracted with hot ethanol to dissolve amidine salt, and thereafter extracted with water to remove unreacted ammonium bromide to leave the crude triphenyl-s-triazine undissolved. The yield of the triazine is 74% based on the weight of the starting benzonitrile.

Table I below summarizes variations in reaction conditions for trimerization of benzonitrile. Run No. 2 is described above in detail. Conditions for the other runs are essentially the same with the variations indicated. It will be noted that in Run No. 1, employing a 1:1 mol ratio of nitrile to ammonium bromide, the yield of triphenyl-s-triazine is 39% as compared to a yield of 74% in Run No. 2 in which about a ½ mol of ammonium bromide is employed per mol of nitrile. Run No. 6 shows the effect of using more than one mol of ammonium salt per mol of nitrile, namely, greatly decreased formation of triphenyl-s-triazine. Run No. 5 shows the effect of substituting another material for ammonia as the reaction medium, namely, almost no formation of triphenyl-s-triazine.

*Table I*

TRIMERIZATION OF BENZONITRILE

| Run No. | Reactant Proportions (moles) | | | Temp., °C. | Time, hr. | Product Yields, Percent Triphenyl-s-triazine [1] |
|---|---|---|---|---|---|---|
| | $C_6H_5CN$ | $NH_4Br$ | $NH_3$ | | | |
| 1 | 0.75 | 0.75 | 0.9 | 155 | 18 | 39 |
| 2 | 1.0 | 0.54 | 1.0 | 150–170 | 18 | 74 |
| 3 | 1.0 | 0.25 | 0.6 | 155 | 18 | 66 |
| 4 | 0.5 | [2] 0.1 | 1.0 | 155 | 18 | 68 |
| 5 | 0.5 | [2] 0.1 | [3] 1.0 ($Et_3N$) | 160 | 18 | <1 |
| 6 | 0.2 | 0.8 ($NH_4Cl$) | ([4]) | 150 | 18 | 0 |

[1] Yield of triphenyl-s-triazine is based on nitrile.
[2] Benzamidine hydrobromide was used.
[3] Triethylamine substituted for ammonia.
[4] Ammonia was passed through the reaction flask at essentially one atmosphere pressure.

EXAMPLE 2

In essentially the same manner as in Example 1, phenylacetonitrile is trimerized in the presence of ammonium bromide and ammonia under the conditions and with the results indicated in Table II below. In these experiments the completely liquid reaction product is diluted with water and the oil phase extracted with ether and dried. Evaporation of the ether then leaves a syrup which is partly soluble in petroleum ether. In Runs 1 and 2, the petroleum ether-solution portion is found to be fairly pure tribenzyl-s-triazine. The undissolved portion could be crystallized from ether-petroleum ether to give the 4-aminopyrimidine which is then crystallized from ethanol, M.P. 103–105° C. (literature, M.P. 106° C.). In run No. 3, which lacks the ammonium bromide catalyst, it will be noted that no s-triazine is formed.

*Table II*

TRIMERIZATION OF PHENYLACETONITRILE

| Run No. | Reactant Proportions (moles) | | | Temp. °C. | Time hrs. | Product yields, percent [1] | |
|---|---|---|---|---|---|---|---|
| | $C_6H_5CH_2CN$ | $NH_4Br$ | $NH_3$ | | | 4-Amino-2,6-dibenzyl-5-phenylpyrimidine | 2,4,6-Tribenzyl-s-triazine |
| 1 | 0.333 | 0.13 | 1.0 | 160 | 18 | 20 | 30 |
| 2 | 0.50 | 0.1 | 0.5 | 160 | 18 | 10 | 25 |
| 3 | 1.0 | 0 | 1.0 | 160 | 18 | 0 | 0 |

[1] Yields are based on starting nitrile.

EXAMPLE 3

2-t-butoxypropionitrile is trimerized to the s-triazine by heating 0.5 mol of the nitrile with 0.1 mol of ammonium bromide and 0.5 mol of ammonia at 130° C. for 5 hours. The petroleum ether-soluble part of the reaction mixture is distilled to recover the product, 2,4,6-tris(1-t-butoxyethyl)-s-triazine, B.P. ca. 185° C. at 2mm., $n_D^{25}$ 1.4511. Yield: 20%, based on starting nitrile.

*Analysis.*—Calcd. for $C_{21}H_{39}N_3O_3$: C, 66.10; H, 10.30; N, 11.01. Found: C, 66.06, 66.31; H, 9.33, 9.69; N, 11.41.

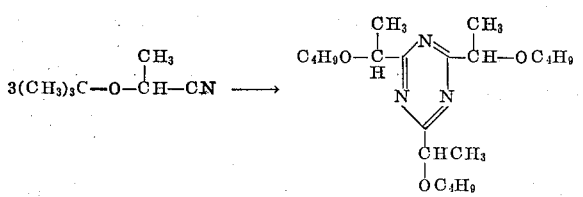
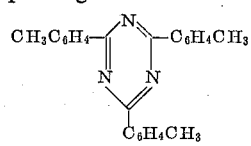

EXAMPLES 4-8

Table III below summarizes the preparations of various other s-triazine products. The reactions tabulated are carried out by passing ammonia continuously through a flask containing the reaction mixture of nitrile and ammonium salt at the specified temperature. An exit bubbler is used to prevent access of moisture and as visible evidence of the constant atmosphere of ammonia. As a general procedure the reaction products are worked up by extracting the residual nitrile with ether and the ammonium salt with water. The undissolved residue of crude product is then recrystallized from a suitable solvent.

monia and catalytic amounts of ammonium bromide to obtain the corresponding tri-substituted-s-triazines:

EXAMPLE 10

In essentially the same manner as in Example 1, p-chlorobenzonitrile (0.30 mol.), ammonium bromide (0.05 mol.) and ammonia (1.0 mol.) are heated together at 160° C. for 18 hours (1150 p.s.i.g.). The usual workup procedure gives 2,4,6-tris(p-chlorophenyl)-s-triazine in 78% yield based on the starting nitrile.

EXAMPLE 11-13

In essentially the same manner as in Examples 4-8, tri-substituted s-triazines, symmetrical and unsymmetrical, were prepared by cotrimerization of nitriles. The conditions and results are summarized in Table IV below.

Table IV
COTRIMERIZATION OF NITRILES

| Ex. | Reactants (moles) | | | Temp., °C. | Time, hours | Products | | |
|---|---|---|---|---|---|---|---|---|
| | Nitriles | Ammonium or amidine salts | Ammonia | | | Name | Yield, percent | M.P. |
| 11 | 4-NO$_2$C$_6$H$_4$CN (0.089) C$_6$H$_5$CN (0.20) | N$_4$HBr (0.018) | (¹) | 150 | 18 | 2-p-Nitrophenyl-4,6-diphenyl-s-triazine.² | 3 | 213-214° C.³ (methoxyethanol). |
| | | | | | | 2,4,6-Tris(p-nitrophenyl)-s-triazine. | 67 | >360° |
| 12 | 2-C$_5$H$_4$N-CN (0.10) C$_6$H$_5$CN (0.20) | NH$_4$Br (0.02) | (¹) | 150 | 18 | 2-Phenyl-4,6-bis(2-pyridyl)-s-triazine.⁶ | 100 | 224.5-226° C.⁴ (methanol). |
| 13 | C$_6$H$_5$CN (0.50) | C$_2$H$_5$C(=NH)(NH$_2$)·HCl (0.10) | 1.0 | 150-160 | 18 | 2,4,6-Triphenyl-s-triazine | 45 | 210-220° C. |
| | | | | | | 4-Amino-5-methyl-2,6-diphenyl-pyrimidine. | 13 | 168-170° C.⁵ |

¹ Ammonia was passed continuously through the reaction flask at essentially one atmospheric pressure.
² The cotrimer was extracted from crude tris-p-nitrophenyl-s-triazine with ethanol and recrystallized from methoxyethanol.
³ Anal. Calcd. for C$_{21}$H$_{14}$N$_4$O$_2$: C, 71.18; H, 3.98; N, 15.81. Found: C, 71.09; H, 3.86; N, 15.64. Reference 11 gives M.P. 218°C.
⁴ Anal. Calcd. for C$_{19}$H$_{13}$N$_5$: C, 73.30; H, 4.20; N, 22.50. Found: C, 73.29; H, 3.89; N, 22.55.
⁵ Anal. Calcd. for C$_{17}$H$_{15}$N$_3$: C, 78.13; H, 5.79; N, 16.08. Found: C, 78.02; H, 5.72; N, 16.05. R. Schwarze, J. prakt. chem., [2], 42, 1 (1890) gives M.P. 168° C.
⁶ This product is a useful chelating agent as a consequence of complexing with heavy metal ions.

Table III
TRIMERIZATION OF MISCELLANEOUS NITRILES AT ATMOSPHERIC PRESSURE

| Example | Nitrile | Reactants (moles) Amidine or Ammonium Salt | Temp., °C. | Time, hrs. | s-Triazine Product, Yield ¹ | |
|---|---|---|---|---|---|---|
| | | | | | Percent | M.P., °C. |
| 4 | 4-NO$_2$C$_6$H$_4$CN (0.10) | 4-NO$_2$C$_6$H$_4$C(=NH)(NH$_2$)·HCl (0.02) | 145-150 | 18 | 45 | >350 |
| 5 | 2-C$_5$H$_4$N-(0.10)⁷ | NH$_4$Br (0.02) | 140 | 2 | 89 | ² 242-242 |
| 6 | (CH$_3$)$_3$C-OCH$_2$CN (0.10) | NH$_4$Br (0.02) | 140-145 | 18 | ca. 50 | ³ 123-145 (pet. ether) |
| 7 | 4-CH$_3$SO$_2$C$_6$H$_4$CN (0.023) | NH$_4$Cl (0.005) | 145 | 18 | ⁴ 61 | ⁵ >360 |
| 8 | 3-NO$_2$C$_6$H$_4$CN (0.20) | NH$_4$Br (0.04) | 147 | 16 | ⁶ 69 | 300 |

¹ Yields are based on starting nitrile.
² F. H. Case and E. Kaft, J. Am. Chem. Soc., 81, 906 (1959) give m.p. 244-245° C for a trihydrate.
³ Anal. Calcd. for C$_{18}$H$_{33}$N$_3$O$_3$: C, 63.68; H, 9.79; N, 12.38; O, 14.15. Found: C, 63.72; H, 9.53; N, 12.65; O, 14.13.
⁴ The crude product was washed with acetone to remove the unreacted nitrile.
⁵ Oxley, Partridge and Short, J. Chem. Soc., 303 (1948), give >360° C. The infrared spectrum was in full agreement with the s-triazine structure.
⁶ The crude product, extracted with ether and with water, was finally extracted with boiling methanol.
⁷ 3-cyanopyridine render under the same conditions reacts to form 2-(3-pyridyl)-1,3,8-triazanaphthalene.

EXAMPLE 9

In essentially the same manner as in Example 1, m- and p-tolunitrile are trimerized in the presence of am-

I claim:

1. A process for preparing tri-substituted s-triazines which comprises reactively contacting, in the presence of ammonia, (1) a nitrile selected from the group consisting of RCN and

wherein R is selected from the group consisting of aryl, alkaryl, chlorophenyl, nitrophenyl, p-methanesulfonylphenyl and pyridyl, R' is selected from the group consisting of aryl and alkoxy, and R'' is selected from the group consisting of hydrogen and alkyl, and (2) a catalytic amount of a salt selected from the group consisting of NH$_4$X and R'''C(NH)NH$_2$·HX wherein R''' is selected from the group consisting of R and

as defined above and X is selected from the group consisting of chlorine and bromine, and recovering resultant s-triazine.

2. A process for preparing tri-substituted s-triazines which comprises reactively contacting, in the presence of ammonia, (1) a nitrile selected from the group consisting of RCN and

wherein R is selected from the group consisting of aryl, alkaryl, chlorophenyl, nitrophenyl, p-methanesulfonylphenyl and pyridyl, R' is selected from the group consisting of aryl and alkoxy, and R'' is selected from the group consisting of hydrogen and alkyl, and (2) a salt selected from the group consisting of NH$_4$X and

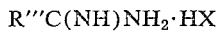

wherein R''' is selected from the group consisting of R and

as defined above and X is selected from the group consisting of chlorine and bromine, in an amount of about 10 to 30 mol percent based on the sum of the amounts of (1) and (2), and recovering resultant s-triazine.

3. A process for preparing a tri-substituted s-triazine which comprises reactively contacting (1) benzonitrile, (2) ammonium bromide, and (3) ammonia in mol ratios of about 1:0.2–0.6:0.5–10, respectively, at about 125° C. to 180° C. and about 700 to 1000 p.s.i.g., and recovering resultant s-triazine.

4. A process for preparing a tri-substituted s-triazine which comprises reactively contacting (1) p-chlorobenzonitrile, (2) ammonium bromide, and (3) ammonia in mol ratios of about 1:0.2–0.6:0.5–10, respectively, at about 125° C. to 180° C. and 700 to 1200 p.s.i.g., and recovering resultant s-triazine.

5. A process for preparing a tri-substituted s-triazine which comprises reactively contacting (1) 2-t-butoxypropionitrile, (2) ammonium bromide, and (3) ammonia in mol ratios of about 1:0.2–0.6:0.5–10, respectively, at about 125° C. to 180° C. and atmospheric pressure, and recovering resultant s-triazine.

6. A process for preparing a tri-substituted s-triazine which comprises reactively contacting (1) phenylacetonitrile, (2) ammonium bromide, and (3) ammonia in mol ratios of about 1:0.2–0.6:0.5–10, respectively, at about 125° C. to 180° C. and about 700 to 1000 p.s.i.g., and recovering resultant s-triazine.

7. A process for preparing a tri-substituted s-triazine which comprises reactively contacting (1) t-butoxyacetonitrile, (2) ammonium bromide, and (3) ammonia in mol ratios of about 1:0.2–0.6:0.5–10, respectively, at about 125° C. to 180° C. and atmospheric pressure, and recovering resultant s-triazine.

8. A process for preparing a tri-substituted s-triazine which comprises reactively contacting (1) p-methanesulfonylbenzonitrile, (2) ammonium chloride, and (3) ammonia in mol ratios of about 1:0.2–0.6:0.5–10, respectively, at about 125° C. to 180° C. and atmospheric pressure, and recovering resultant s-triazine.

9. A process for preparing a tri-substituted s-triazine which comprises reactively contacting (1) m-nitrobenzonitrile, (2) ammonium bromide, and (3) ammonia in mol ratios of about 1:0.2–0.6:0.5–10, respectively, at about 125° C. to 180° C. and atmospheric pressure, and recovering resultant s-triazine.

10. A process for preparing a tri-substituted s-triazine which comprises reactively contacting (1) 2-cyanopyridine, (2) ammonium bromide, and (3) ammonia in mol ratios of about 1:0.2–0.6:0.5–10, respectively, at about 125° C. to 180° C. and atmospheric pressure, and recovering resultant s-triazine.

11. A process for preparing 2-phenyl-4,6-bis(2-pyridyl)-s-triazine which comprises reactively contacting, in the presence of ammonia, (1) 2-cyanopyridine, (2) benzonitrile, and (3) ammonium bromide in a mol ratio of about 0.5:1:0.1, respectively, at about 125° C. to 180° C. and atmospheric pressure, and recovering resultant s-triazine.

12. 2-phenyl-4,6-bis(2-pyridyl)-s-triazine.

References Cited by the Examiner
UNITED STATES PATENTS

| | | | |
|---|---|---|---|
| 2,849,451 | 8/1958 | Hechenbleikner | 260—248 |
| 3,071,586 | 1/1963 | Sander | 260—248 |
| 3,095,414 | 6/1963 | Spainhour | 260—248 |

WALTER A. MODANCE, *Primary Examiner.*

JOHN M. FORD, *Assistant Examiner.*